(12) United States Patent
Xue et al.

(10) Patent No.: US 12,489,219 B2
(45) Date of Patent: Dec. 2, 2025

(54) BEAMFORMING NETWORK ARCHITECTURE OF N-DRIVE-M NETWORK

(71) Applicant: Huawei Technologies Co., Ltd., Shenzhen (CN)

(72) Inventors: Tuanjie Xue, Shanghai (CN); Guanxi Zhang, Shanghai (CN); Mingcui Tao, Shanghai (CN); Long Shen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 18/344,178

(22) Filed: Jun. 29, 2023

(65) Prior Publication Data
US 2023/0344142 A1    Oct. 26, 2023

Related U.S. Application Data

(63) Continuation of application No. PCT/CN2020/141434, filed on Dec. 30, 2020.

(51) Int. Cl.
*H01Q 21/00*   (2006.01)
*H01P 5/12*    (2006.01)
*H01Q 15/00*   (2006.01)

(52) U.S. Cl.
CPC .......... *H01Q 21/0006* (2013.01); *H01P 5/12* (2013.01); *H01Q 15/0033* (2013.01)

(58) Field of Classification Search
CPC ... H01Q 21/0006; H01Q 15/0033; H01P 5/12
See application file for complete search history.

(56) References Cited

U.S. PATENT DOCUMENTS

| | | |
|---|---|---|
| 2017/0141481 A1 | 5/2017 | Geng et al. |
| 2020/0058996 A1 | 2/2020 | Reddy |

FOREIGN PATENT DOCUMENTS

| | | | | |
|---|---|---|---|---|
| CN | 1921341 A | 2/2007 | | |
| CN | 105742828 A | 7/2016 | | |
| CN | 205790400 U | 12/2016 | | |
| CN | 109755746 A | 5/2019 | | |
| CN | 111682321 A | * 9/2020 | ......... | H01Q 21/0006 |

* cited by examiner

*Primary Examiner* — Henry Luong
(74) *Attorney, Agent, or Firm* — Slater Matsil, LLP

(57) ABSTRACT

A first circuit includes at least one bridge, where input ends of the at least one bridge are coupled to digital channels in N analog networks, to perform digital weighting and analog on a received electrical signal; a second circuit includes at least one bridge, where output ends of the at least one bridge are coupled to M antennas, to perform digital weighting and analog on a received electrical signal; and a connection circuit includes at least one power splitter.

20 Claims, 14 Drawing Sheets

(b) φ = −90°

BEAMFORMING NETWORK ARCHITECTURE OF N-DRIVE-M NETWORK

CROSS-REFERENCE TO RELATED APPLICATIONS

This application is a continuation of International Application No. PCT/CN2020/141434, filed on Dec. 30, 2020, the disclosure of which is hereby incorporated by reference in its entirety.

TECHNICAL FIELD

This application relates to the field of communication antenna technologies, and in particular, to a beamforming network architecture of an N-drive-M network.

BACKGROUND

In a conventional mobile communication system, a cellular network usually implements 360° all-round coverage by using three 120° sectors, as shown in FIG. 1. For example, a normal 8T8R wireless communication is implemented by four columns of dual-polarized antennas. For a single polarized horizontal plane of each column, a 3 dB beamwidth of 65° is used to implement 120° sector area coverage.

However, because it is difficult for a single-column horizontal plane beamwidth to implement a 65° beamwidth, and especially when a horizontal array spacing is 0.5 wavelength, it is difficult to implement the 120° sector area coverage. Specific coverage effect is shown in FIG. 2(a). Even if the single-column horizontal plane beamwidth implements the 65° beamwidth, it is difficult to implement an ideal situation in which a rectangular beam shown in FIG. 2(b) achieves a fast decrease outside the 120° sector area and good coverage within the 120° sector area.

To implement the ideal situation shown in FIG. 2(b), a plurality of co-coverage wide beams may be implemented by performing forming on a plurality of columns of antennas, as shown in FIG. 3. However, normal multi-beamforming only implements a plurality of narrow beams, and the plurality of narrow beams implement space division effect. Consequently, simultaneous coverage cannot be implemented.

SUMMARY

To resolve the foregoing problem, embodiments of this application provide a beamforming network architecture of an N-drive-M network.

This application provides a beamforming network architecture of an N-drive-M network. The architecture includes: a first circuit, a connection circuit, and a second circuit. The first circuit includes at least one bridge, where input ends of the at least one bridge are coupled to digital channels in N analog networks, and are configured to perform digital weighting and analog on a received electrical signal. N is a positive integer greater than 2. The second circuit includes at least one bridge, where output ends of the at least one bridge are coupled to M antennas, and are configured to perform digital weighting and analog on a received electrical signal. M is a positive integer greater than 2, and M is greater than or equal to N. The connection circuit includes at least one power splitter. An input end of the at least one power splitter is coupled to an output end of the at least one bridge in the first circuit. An output end of the at least one power splitter is coupled to an input end of the at least one bridge in the second circuit, to divide a quantity of electrical signals from N to M through power splitting.

In this implementation, a designed beamforming network architecture can implement a plurality of wide beams or a plurality of narrow beams by connecting a plurality of levels of components. In addition, a plurality of wide beam ports are highly isolated. Narrow beam sweeping in a coverage area may also be implemented through the network. The beamforming network may be implemented through an analog beam network, or may be implemented through a digital beam network, or may be implemented through a combination of a digital network and an analog network, to finally improve an indicator, for example, a cell capacity.

In an implementation, the first circuit includes a first bridge, the second circuit includes a second bridge, and the connection circuit includes a first power splitter. Input ends of the first bridge are coupled to the digital channels in N analog networks. A first output end of the first bridge is coupled to an input end of the first power splitter, and a second output end of the first bridge is coupled to a first input end of the second bridge. A first output end of the first power splitter is coupled to an antenna, and a second output end the first power splitter is coupled to a second input end of the second bridge. Output ends of the second bridge are separately coupled to M antennas.

In this implementation, compared with a current butler matrix network, a provided beamforming network architecture has advantages of low complexity and easy engineering implementation. In addition, a beam output by an antenna is applicable to pattern forming capabilities in different scenarios. Antenna mapping of a digital weighting and analog network forms beams with different directions. Beam flexibility is increased and a benefit of inter-beam power sharing is achieved.

In an implementation, the connection circuit further includes a first phase shifter, where the first phase shifter is disposed between the second output end of the first bridge and a first output end of the second bridge. This adjusts an amplitude and a phase of an electrical signal output by the second bridge, to enable the amplitude and the phase of the output electrical signal to be flexible.

In an implementation, the first circuit includes a third bridge and a fourth bridge, the second circuit includes a fifth bridge, a sixth bridge, and a seventh bridge, and the connection circuit includes a second power splitter and a third power splitter. Input ends of the third bridge and the fourth bridge are coupled to the digital channels in N analog networks. A first output end of the third bridge is coupled to an input end of the second power splitter, and a second output end of the third bridge is coupled to one end of a first input end of the fifth bridge and a first input end of the sixth bridge. A first output end of the fourth bridge is coupled to an input end of the third power splitter, and a second output end of the fourth bridge is coupled to one end of a second input end of the sixth bridge and a first input end of the seventh bridge. A first output end of the second power splitter is coupled to a second input end of the fifth bridge, and a second output end of the second power splitter is coupled to the other end of the second input end of the sixth bridge and the first input end of the seventh bridge. A first output end of the third power splitter is coupled to a second input end of the seventh bridge, and a second output end of the third power splitter is coupled to the other end of the first input end of the fifth bridge and the first input end of the sixth bridge. Output ends of the fifth bridge, the sixth bridge, and the seventh bridge are separately coupled to M antennas.

In this implementation, although the provided beamforming network architecture is more complex than a structure in Embodiment 1, compared with the current butler matrix network, the provided beamforming network architecture is clearly less complex and is easy to implement in engineering. In addition, the beam output by the antenna is applicable to the pattern forming capabilities in different scenarios. The antenna mapping of the digital weighting and analog network forms the beams with different directions. The beam flexibility is increased and the benefit of inter-beam power sharing is achieved.

In an implementation, the connection circuit further includes an eighth bridge and a ninth bridge. An input end of the eighth bridge is coupled to a second output end of the second power splitter and the second output end of the fourth bridge. An output end of the eighth bridge is coupled to the second input end of the sixth bridge and the first input end of the seventh bridge, to perform digital weighting and analog on a received electrical signal. An input end of the ninth bridge is coupled to the second output end of the third power splitter and the second output end of the seventh bridge. An output end of the ninth bridge is coupled to the first input end of the fifth bridge and the first input end of the sixth bridge, to perform digital weighting and analog on a received electrical signal. This enables amplitudes and phases of the output electrical signals to be flexible and variable.

In an implementation, the first circuit includes a tenth bridge, the second circuit includes an eleventh bridge and a twelfth bridge, and the connection circuit includes a fourth power splitter and a fifth power splitter. A first output end of the tenth bridge is coupled to the fourth power splitter, and a second output end of the tenth bridge is coupled to the fifth power splitter. A first output end of the fourth power splitter is coupled to a first input end of the eleventh bridge, and a second output end of the fourth power splitter is coupled to a first input end of the twelfth bridge. A first output end of the fifth power splitter is coupled to a second input end of the eleventh bridge, and a second output end of the fifth power splitter is coupled to a second input end of the twelfth bridge. Output ends of the eleventh bridge and the twelfth bridge are separately coupled to M antennas.

In this implementation, compared with the current butler matrix network, the provided beamforming network architecture has advantages of low complexity and easy engineering implementation. In addition, the beam output by the antenna is applicable to the pattern forming capabilities in different scenarios. The antenna mapping of the digital weighting and analog network forms the beams with different directions and the beam flexibility is increased.

In an implementation, the connection circuit includes a second phase shifter, a third phase shifter, and a fourth phase shifter. The second phase shifter is disposed at the first output end of the fifth power splitter and the second input end of the eleventh bridge. The third phase shifter is disposed at a second output end of the fourth power splitter and the first input end of the twelfth bridge. The fourth phase shifter is disposed at the second output end of the fifth power splitter and the second input end of the twelfth bridge. This adjusts amplitudes and phases of electrical signals output by the eleventh bridge and the twelfth bridge, to enable the amplitudes and the phases of the output electrical signals to be flexible.

In an implementation, the second circuit includes a fifth phase shifter, a sixth phase shifter, and a seventh phase shifter. The fifth phase shifter, the sixth phase shifter, and the seventh phase shifter are separately disposed at a second output end of the eleventh bridge and a first output end and a second output end of the twelfth bridge. This adjusts phases of one of electrical signals output by the eleventh bridge and two electrical signals output by the twelfth bridge, to enable the phases of the output electrical signals to be flexible.

BRIEF DESCRIPTION OF THE DRAWINGS

The following briefly describes the accompanying drawings that need to be used in the descriptions of embodiments or a conventional technology.

DETAILED DESCRIPTION OF ILLUSTRATIVE EMBODIMENTS

The following describes the technical solutions in embodiments of this application with reference to the accompanying drawings in embodiments of this application.

Figure 4:
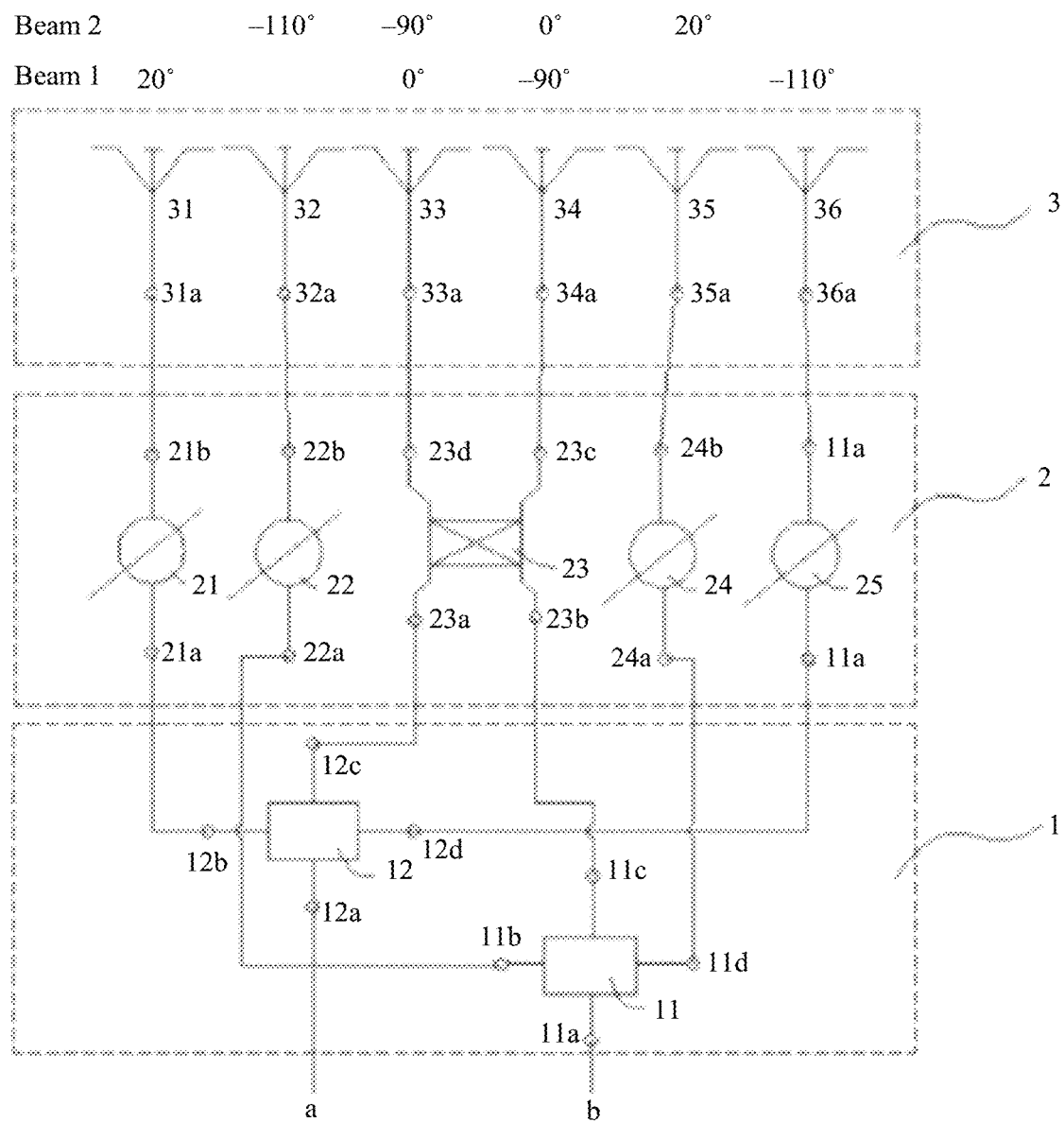
FIG. 4 is a diagram of a beamforming network architecture in the conventional technology.

FIG. 4 is a diagram of a beamforming network architecture in a conventional technology. As shown in FIG. 4, the architecture includes an input port a, an input port b, bridges 11, 12, and 23, phase shifters 21 to 25, and antennas 31 to 36. The input port a is coupled to the bridge 12, and the bridge 12 is separately coupled to an input end of the phase shifter 21, an input end of the phase shifter 25, and an input end of the bridge 23. The input port b is coupled to the bridge 11, and the bridge 11 is separately coupled to another input end of the phase shifter 22, another input end of the phase shifter 24, and another input end of the bridge 23. The phase shifter 21 is coupled to the antenna 31. The phase shifter 22 is coupled to the antenna 32. The phase shifter 24 is coupled to the antenna 35. The phase shifter 25 is coupled to the antenna 36. Two output ends of the bridge 23 are separately coupled to the antenna 33 and the antenna 34.

Figure 1:
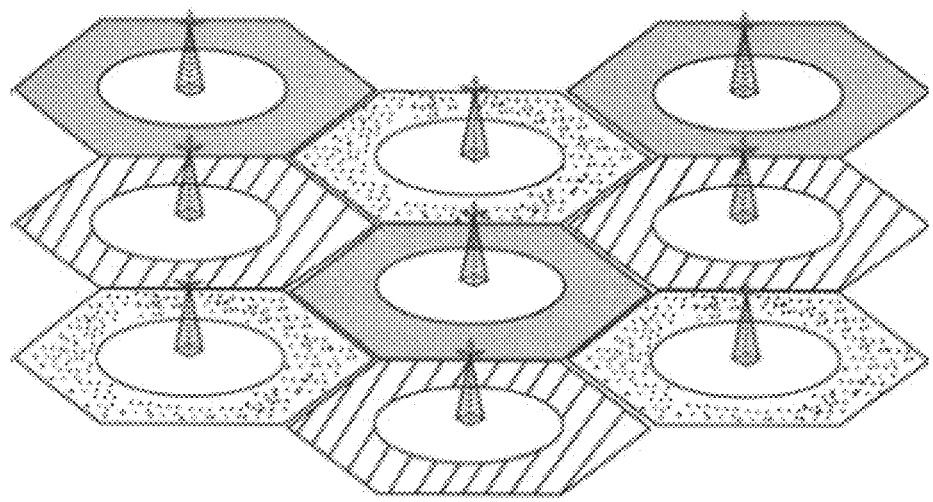
FIG. 1 is a schematic diagram of a cellular network.
Figure 2A:
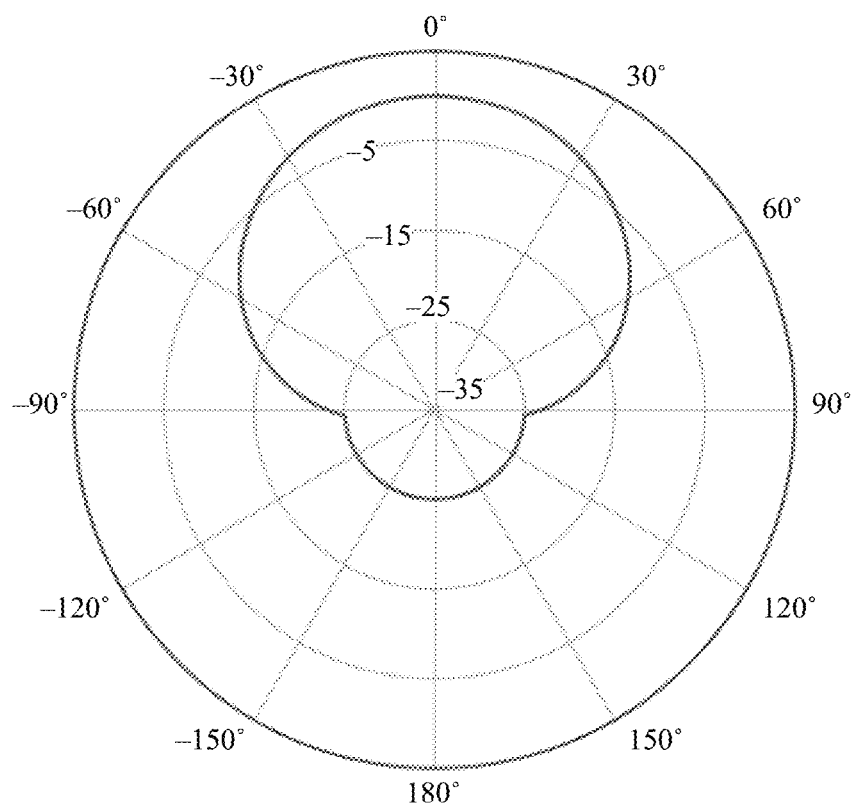
FIG. 2(a) is a normal beam coverage pattern.
Figure 2B:
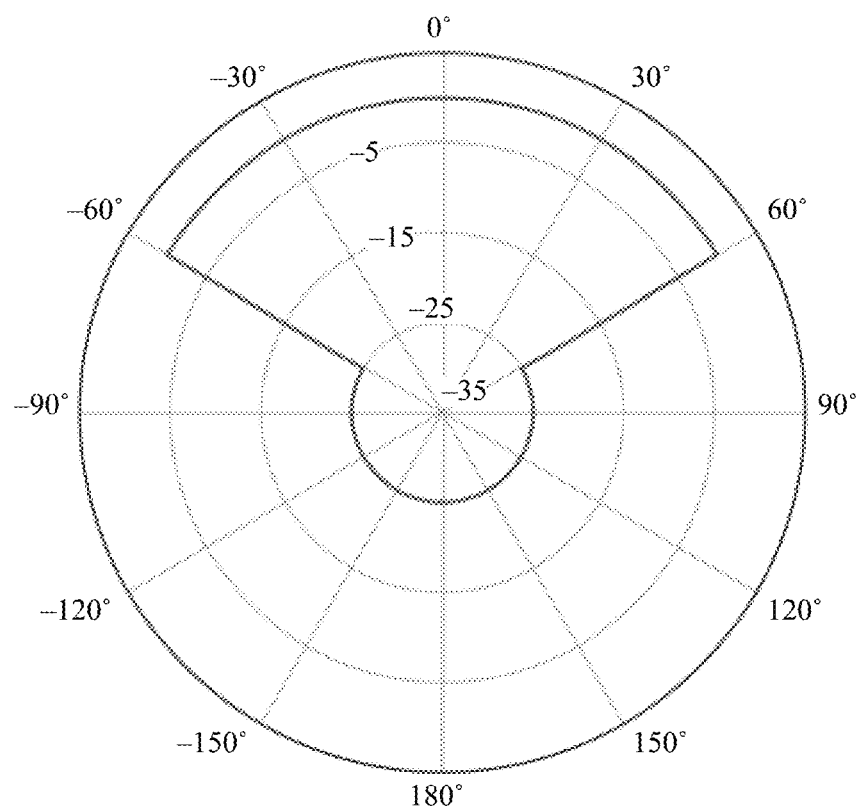
FIG. 2(b) is an ideal beam coverage pattern.
Figure 3:
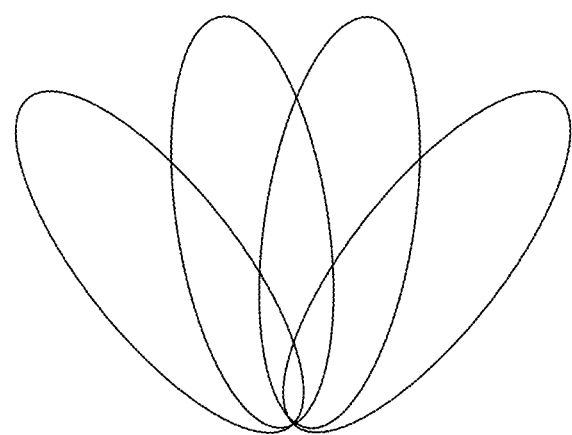
FIG. 3 is a multi-narrow-beam coverage pattern.
Figure 5:
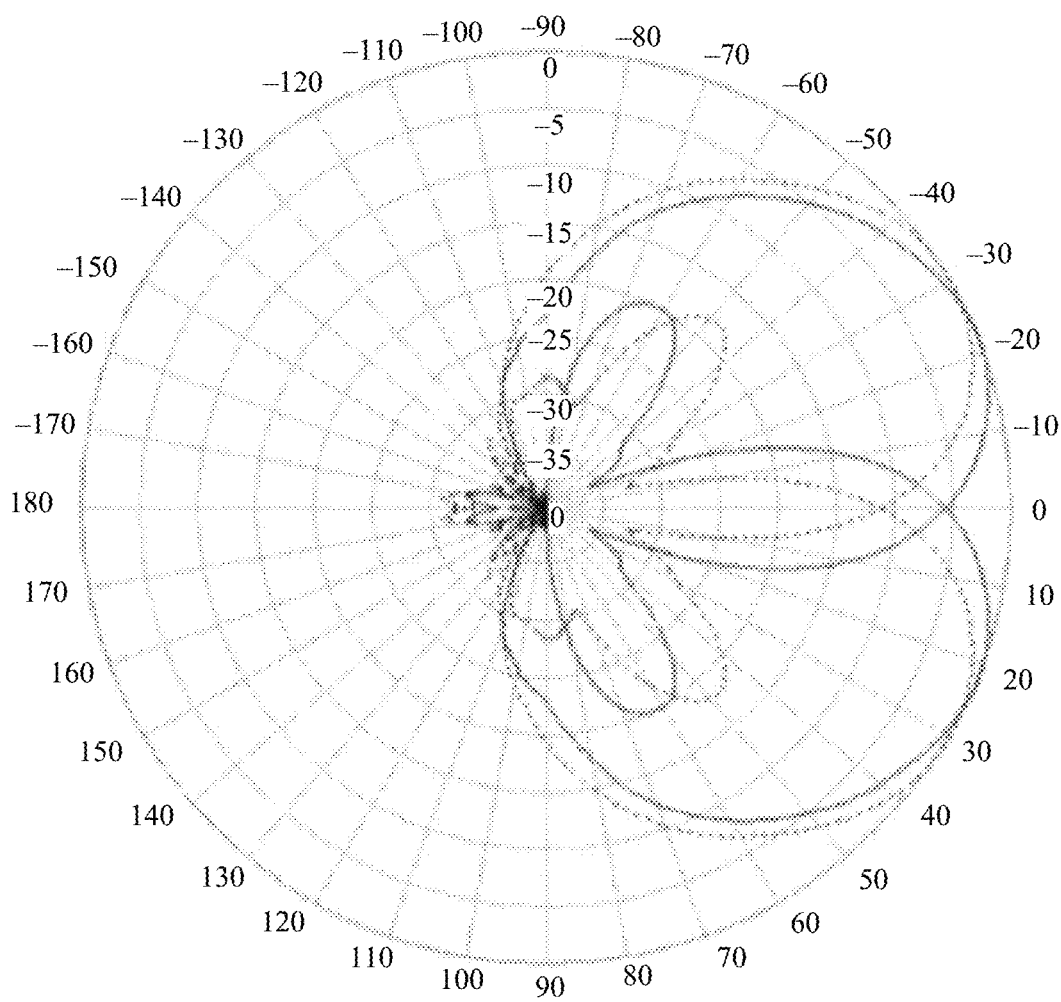
FIG. 5 is a beam coverage pattern in the conventional technology.

After the input port a and the input port b are coupled to a baseband, a coverage pattern of beams sent by the antennas 31 to 36 is shown in FIG. 5. Compared with a beam coverage pattern shown in FIG. 3, the beam coverage pattern shown in FIG. 5 is closer to an ideal situation in FIG. 2(b), but the system shown in FIG. 4 implements 120° beam coverage through a single-column in an array antenna. A beam electrical level decreases slowly outside a coverage area, rectangularity is poor, and interference is easily caused to a neighbor cell. In addition, implementation of the architecture structure is complex, and a large quantity of components is used.

Figure 6:
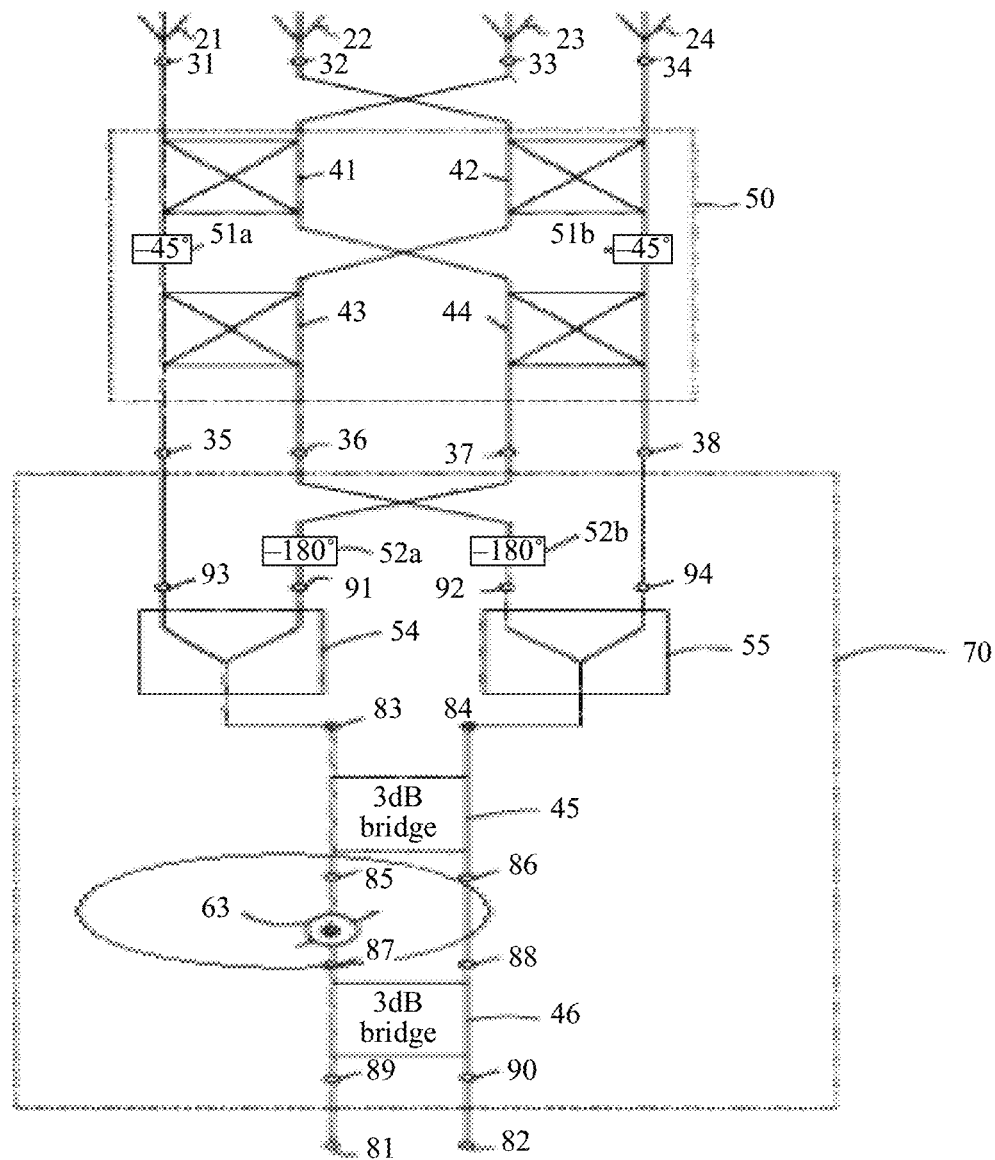
FIG. 6 is a diagram of a beamforming network architecture in the conventional technology.
Figure 7:
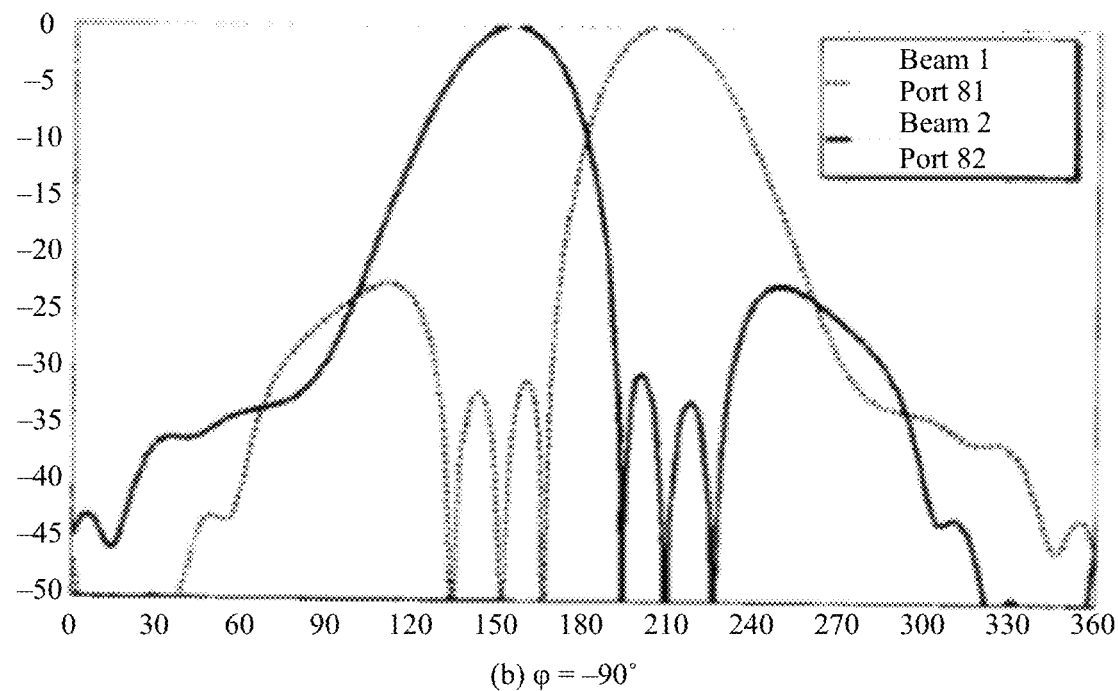
FIG. 7 is a beam coverage pattern in the conventional technology.

FIG. 6 is a classic beamforming network architecture with a variable beamwidth that is implemented through a butler (butler) matrix. In this architecture, a plurality of beams are implemented through the butler matrix, and a quantity of phase shifters can be reduced to one. A beam shape is changed by changing a value of a phase shifter. In this case, effect of a beam coverage pattern is shown in FIG. 7. However, implementation of the butler matrix is complex, broadband performance is poor, and costs are high.

Figure 8:
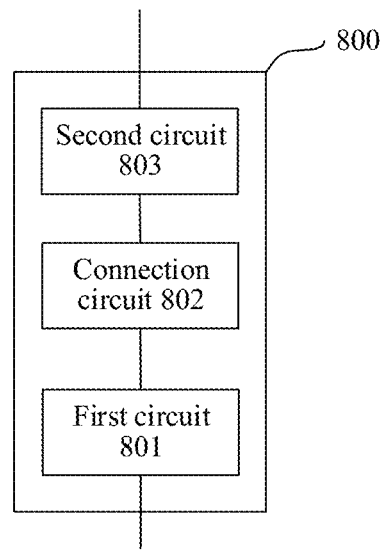
FIG. 8 is a block diagram of a structure of a beamforming network architecture of an N-drive-M network according to an embodiment of this application.

To resolve a problem in the conventional technology, this application provides a beamforming network architecture of an N-drive-M network. As shown in FIG. 8, the architecture 800 includes a first circuit 801, a connection circuit 802, and a second circuit 803. The first circuit 801 is coupled to the second circuit 803 through the connection circuit 802.

The first circuit 801 is a circuit coupled to a digital channel in an analog network of hardware. The circuit includes at least one bridge, and a quantity of bridges is related to a quantity N of output ends of the digital channel. Each bridge is coupled to output ends of two digital channels and performs digital weighting and analog on electrical signals of the output ends of the two digital channels. Beams with different directions are formed through antenna mapping of digital weighting and analog. In the first circuit 801 in this application, all bridges are disposed at a same level, so that a loss caused by serial connection of components can be reduced. N is a positive integer greater than 2.

The second circuit 803 is a circuit coupled to an antenna in the analog network of hardware. The circuit includes at least one bridge, and a quantity of bridges is related to a quantity M of network output ends. If the quantity M of the output ends is an even number, the quantity of bridges in the second circuit 803 is M/2. If the quantity M of the output ends is an odd number, the quantity of bridges in the second circuit 803 is (M−1)/2. Each bridge is coupled to two network output ends, and is configured to output electrical signals with different beams. In the second circuit 803 in this application, all bridges are disposed at a same level, so that the loss caused by the serial connection of components can be reduced. M is a positive integer greater than 2, and is greater than or equal to N.

The connection circuit 802 includes at least one power splitter that is configured to split at least two electrical signals output by the first circuit 801 into a corresponding quantity of input signals in the second circuit 803.

The beamforming network architecture designed in this application can implement a plurality of wide beams or a plurality of narrow beams by connecting a plurality of levels of components. In addition, a plurality of wide beam ports are highly isolated. Narrow beam sweeping in a coverage area may also be implemented through the network. The beamforming network may be implemented through an analog beam network, or may be implemented through a digital beam network, or may be implemented through a combination of a digital network and an analog network, to finally improve an indicator, for example, a cell capacity.

Embodiment 1

Figure 9:
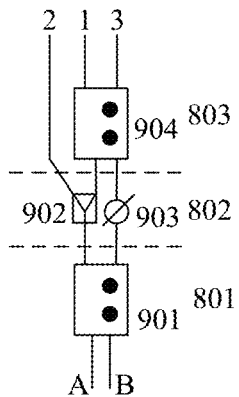
FIG. 9 is a diagram of a beamforming network architecture of a 2-drive-3 network according to Embodiment 1 of this application.

FIG. 9 is a diagram of a beamforming network architecture of a 2-drive-3 network according to an embodiment of this application. As shown in FIG. 9, in the architecture, a first circuit 801 includes a bridge 901, a connection circuit 802 includes a power splitter 902, and a second circuit includes a bridge 904. An output end A and an output end B of a digital channel are separately coupled to the bridge 901. The bridge 901 performs digital weighting and analog on electrical signals of the output end A and the output end B, and then separately inputs the electrical signals to the power splitter 902 and one input end of the bridge 904. The power splitter 902 divides an input electrical signal into two electrical signals with different powers based on a specific power division ratio. One electrical signal is directly input to a network output end to be coupled to an antenna, and the other electrical signal is input to one input end of the bridge 904. The bridge 904 receives the electrical signals input by the power splitter 902 and the bridge 901, performs digital weighting and analog on the electrical signals, and outputs two different electrical signals to the network output end to be coupled to the antenna.

Optionally, the connection circuit 802 further includes a phase shifter 903. The phase shifter 903 is disposed between an output end that is of the bridge 901 and that is directly coupled to the bridge 904 and an input end that is of the bridge 904 and that is directly coupled to the bridge 901, and is configured to adjust, based on a specific phase, an amplitude and a phase of an electrical signal output by the bridge 901 and input the electrical signal to the bridge 904.

In this application, a width of a beam and a height of a side lobe of a beam pair can be optimized by adjusting a power division ratio of the power splitter 902, and a beam adjustment and optimization capability is improved. In addition, because a quantity of output ends of the digital channel is fixed, in other words, when a quantity of channels is fixed, an antenna installation platform is increased through the power splitter 902, and a system capacity and coverage effect are improved.

Figure 10:
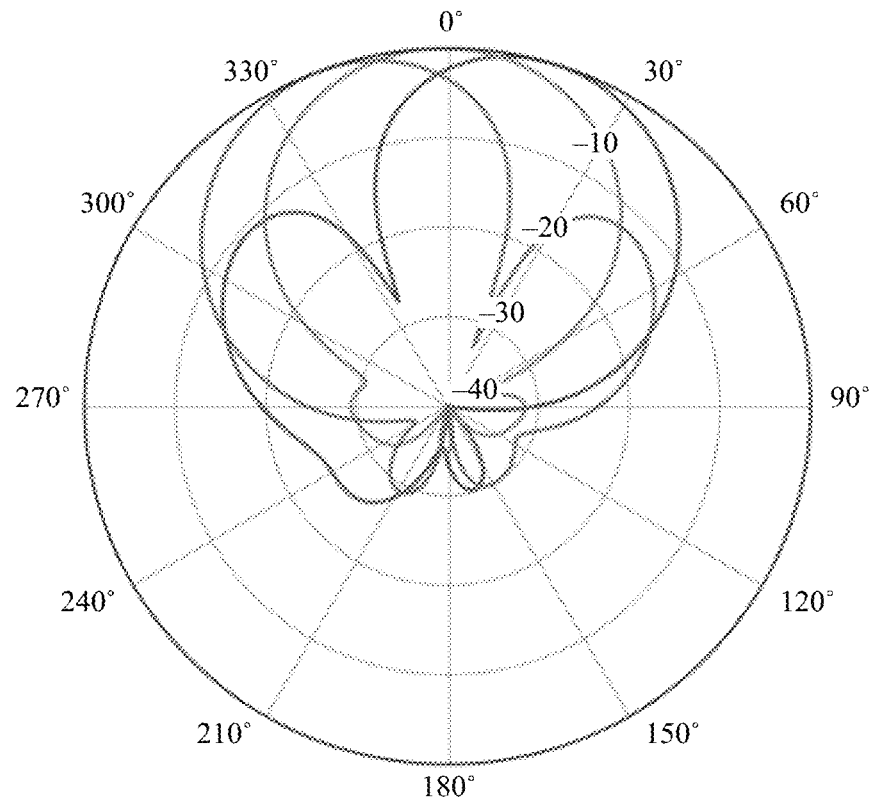
FIG. 10 is a codebook beam coverage pattern according to Embodiment 1 of this application.
Figure 11:
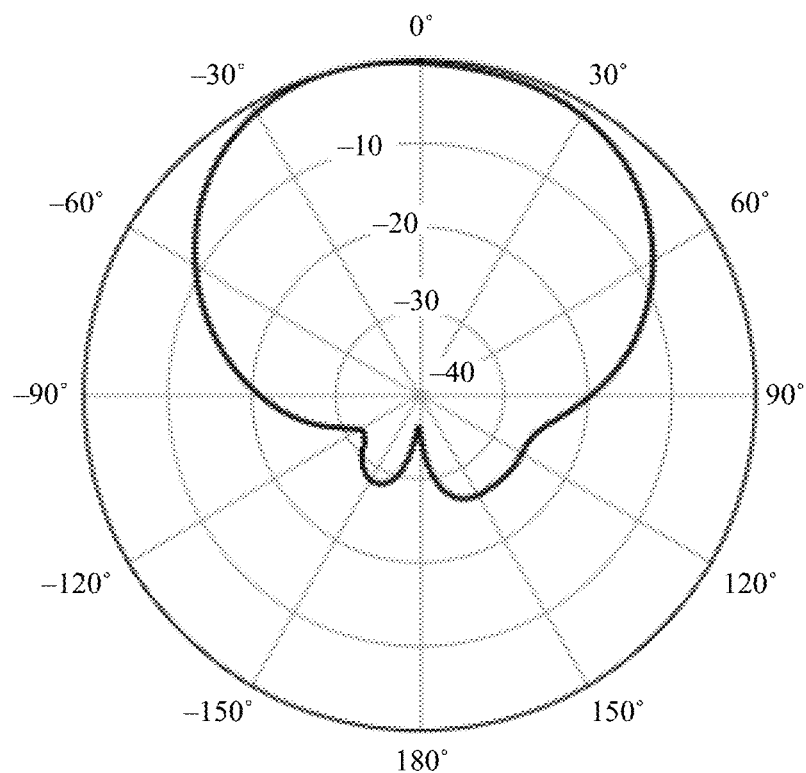
FIG. 11 is a beam coverage pattern according to Embodiment 1 of this application.

For example, the bridge 901 performs summing and differencing on the electrical signals of the output end A and the output end B to obtain two different electrical signals. Then, the bridge 901 inputs an electrical signal obtained through summing to the phase shifter 903, and inputs an electrical signal obtained through differencing to the power splitter 902. The power splitter 902 performs power allocation on the input electrical signal based on a ratio of 0.78:0.61, to directly output an electrical signal with a high power, and inputs an electrical signal with a low power to the bridge 904. The phase shifter 903 sets a phase shift of 194°. In this case, codebook effect of beams output by three output ends in the beamforming network architecture of the 2-drive-3 network in this application are shown in FIG. 10, so that a forming effect diagram of a pattern of a beam output by the architecture is obtained, as shown in FIG. 11.

Compared with the conventional technology shown in FIG. 5 and FIG. 7, a pattern of a beamforming network in Embodiment 1 of this application ranges from −60° to 60°, and coverage effect is better. In addition, a beam electrical level at −60° and 60° decreases at a fast speed, rectangularity is good, and interference to a neighbor cell is weak. This improves a cell edge capacity and a cell average system capacity.

Figure 12:
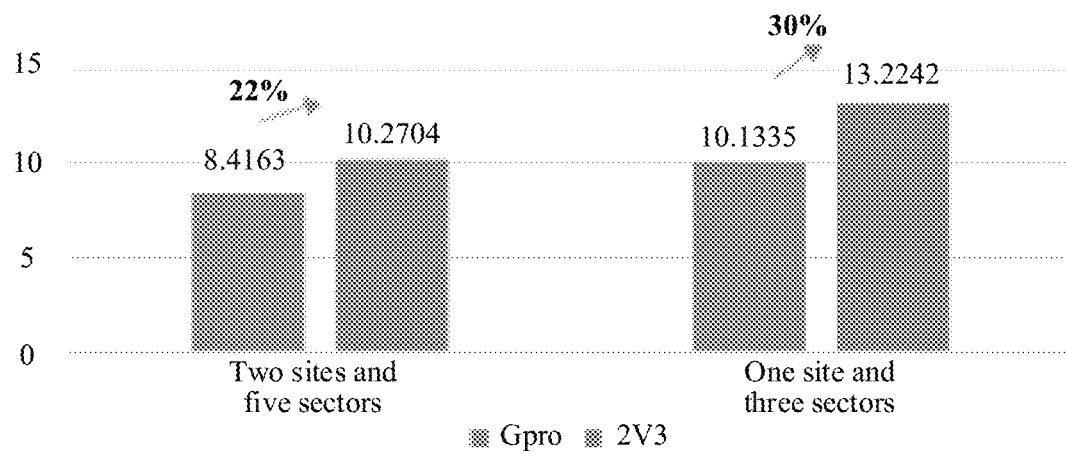
FIG. 12 is a diagram of comparison between an average throughput of a 2-drive-3 network architecture and an average throughput of a current 2-column antenna cell according to Embodiment 1 of this application.

In addition, in the beamforming network architecture of the 2-drive-3 network provided in Embodiment 1 of this application, compared with a two-column antenna (4T4R) solution, an average cell throughput is greatly improved through a large quantity of Airview system simulation, as shown in FIG. 12.

Compared with a current butler matrix network, the beamforming network architecture provided in Embodiment 1 of this application has advantages of low complexity and easy engineering implementation. In addition, a beam output by an antenna is applicable to pattern forming capabilities in different scenarios. Antenna mapping of digital weighting and analog network forms beams with different directions. Beam flexibility is increased and a benefit of inter-beam power sharing is achieved.

Embodiment 2

Figure 13:
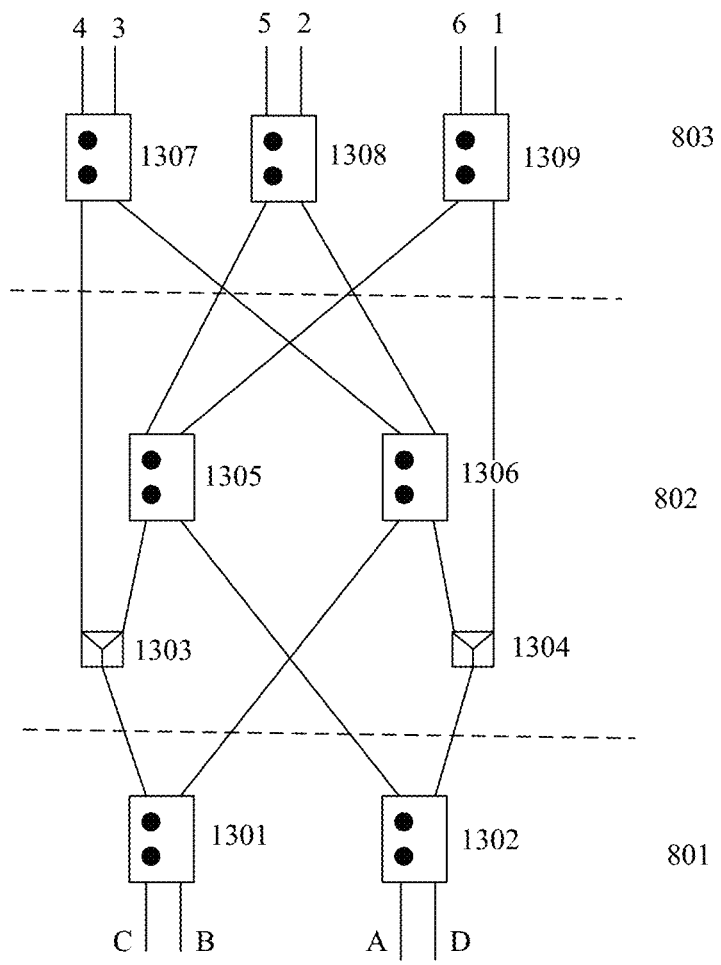
FIG. 13 is a diagram of a beamforming network architecture of a 4-drive-6 network according to Embodiment 2 of this application.

FIG. 13 is a diagram of a beamforming network architecture of a 4-drive-6 network according to an embodiment of this application. As shown in FIG. 13, in the architecture, a first circuit 801 includes a bridge 1301 and a bridge 1302, a connection circuit 802 includes a power splitter 1303 and a power splitter 1304, and a second circuit 803 includes a bridge 1307, a bridge 1308, and a bridge 1309.

An output end C and an output end B of a digital channel are separately coupled to the bridge 1301. The bridge 1301 performs digital weighting and analog on electrical signals of the output end C and the output end B, and then separately inputs the electrical signals to one of the power splitter 1303, the bridge 1308, or the bridge 1309. An output end A and an output end D of the digital channel are separately coupled to the bridge 1302. The bridge 1302 performs digital weighting and analog on electrical signals of the output end A and the output end D, and then separately inputs the electrical signals to one of the power splitter 1304, the bridge 1307, or the bridge 1308. The power splitter 1303 divides an input electrical signal into two electrical signals with different powers based on a specific power division ratio. One electrical signal is directly input to the bridge 1307, and the other electrical signal is input to the bridge 1308 or the bridge 1309. The power splitter 1304 divides input electrical signals into two electrical signals with different powers based on a set power division ratio. One electrical signal is directly input to the bridge 1309, and the other electrical signal is input to the bridge 1307 or the bridge 1308. Two input ends of the bridge 1307, the bridge 1308, and the bridge 1309 separately receive two groups of electrical signals, perform digital weighting and analog on the two groups of electrical signals, and output two different electrical signals to a network output end to be coupled to an antenna.

Optionally, the connection circuit 802 further includes a bridge 1305 and a bridge 1306. Two input ends of the bridge 1305 are separately coupled to one output end of the power splitter 1303 and one output end of the bridge 1302, and two output ends of the bridge 1305 are coupled to one input end of the bridge 1308 and one input end of the bridge 1309. Two input ends of the bridge 1306 are separately coupled to one output end of the power splitter 1304 and one output end of the bridge 1301, and two output ends of the bridge 1306 are coupled to the bridge 1307 and one input end of the bridge 1308. In this application, the bridge 1305 and the bridge 1306 are added to the connection circuit 802, to enable phases and amplitudes of the output electrical signals to be flexible and variable.

In this application, a width of a beam and a height of a side lobe of a beam pair can be optimized by adjusting a power division ratio of the power splitter 1303 and the power splitter 1304, and a beam adjustment and optimization capability is improved. In addition, because a quantity of output ends of the digital channel is fixed, in other words, when a quantity of channels is fixed, an antenna installation platform is increased through a power splitter 902, and a system capacity and coverage effect are improved.

Figure 14:
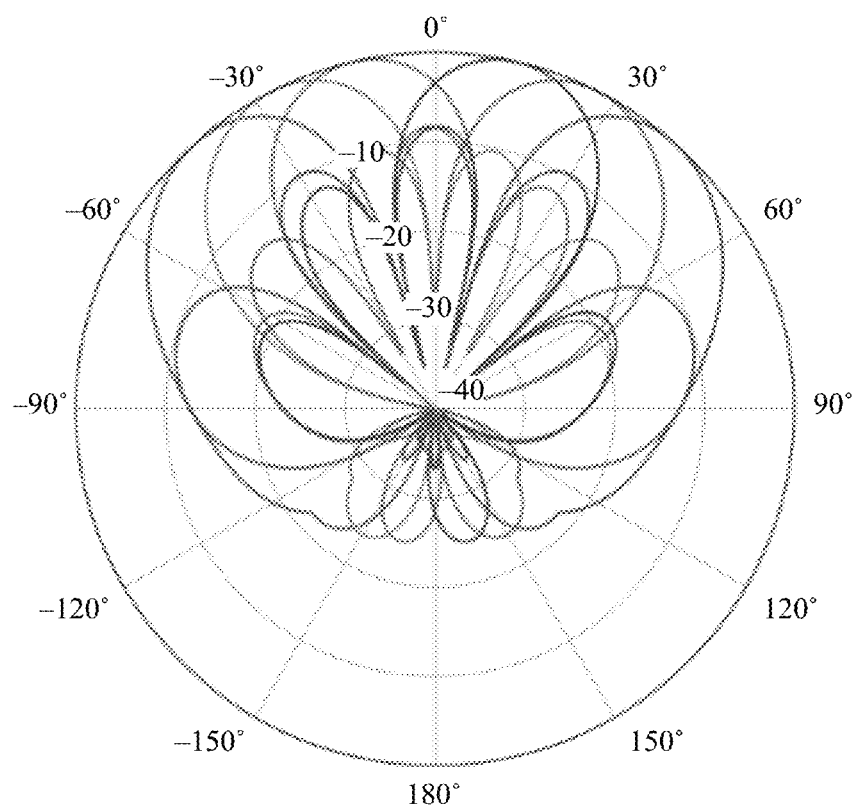
FIG. 14 is a codebook beam coverage pattern according to Embodiment 2 of this application.
Figure 15:
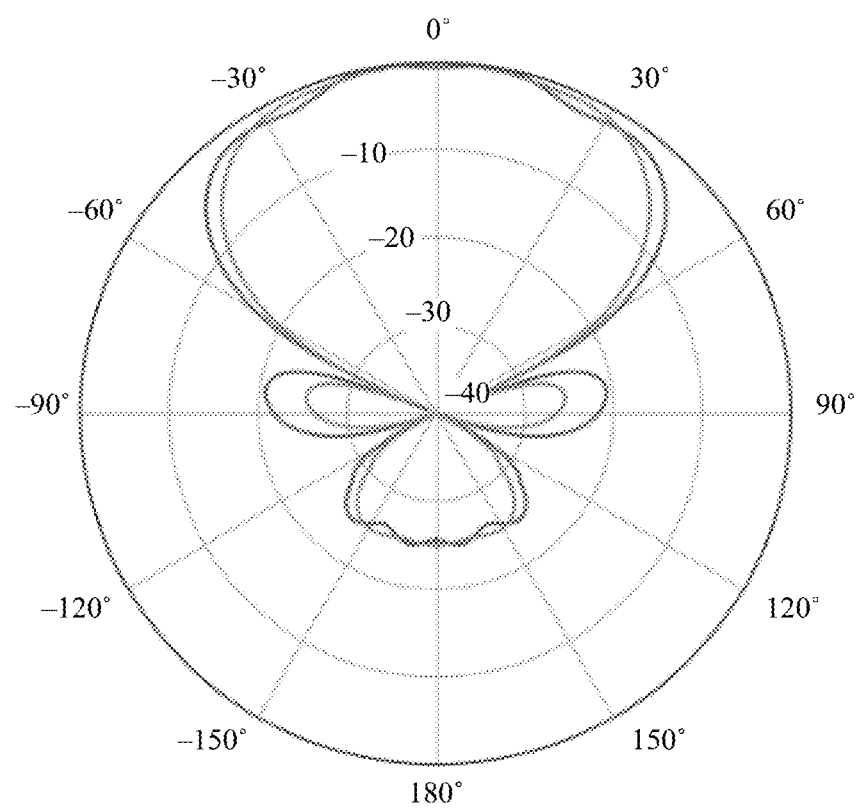
FIG. 15 is a beam coverage pattern according to Embodiment 2 of this application.

For example, codebook effect of beams output by six output ends in the beamforming network architecture of the 4-drive-6 network in this application is shown in FIG. 14, so that a forming effect diagram of a pattern of a beam output by the architecture is obtained, as shown in FIG. 15. Compared with the conventional technology shown in FIG. 5 and FIG. 7, a pattern of a beamforming network in Embodiment 1 of this application ranges from −60° to 60°, and coverage effect is better. In addition, a beam electrical level at −60° and 60° decreases at a fast speed, and effect is better than that of FIG. 11 in Embodiment 1.

Although the beamforming network architecture provided in Embodiment 2 in this application is more complex than the structure in Embodiment 1, compared with a current butler matrix network, the beamforming network architecture provided in Embodiment 2 of this application is clearly less complex and is easy to implement in engineering. In addition, a beam output by an antenna is applicable to pattern forming capabilities in different scenarios. Antenna mapping of digital weighting and analog network forms beams with different directions. Beam flexibility is increased and a benefit of inter-beam power sharing is achieved.

Embodiment 3

Figure 16:
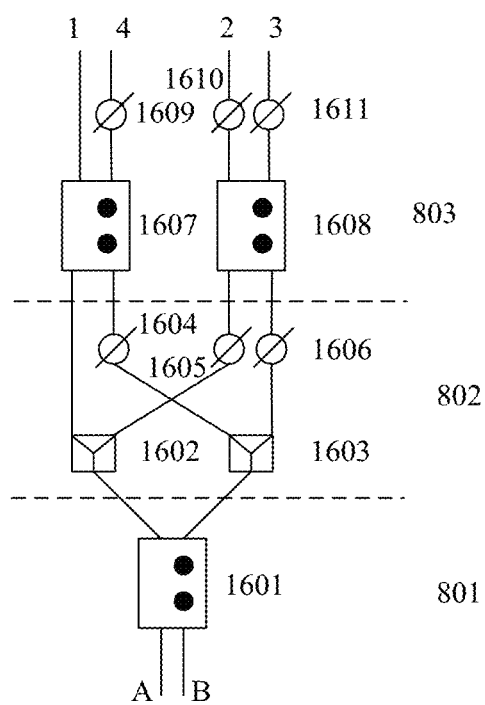
FIG. 16 is a diagram of a beamforming network architecture of a 2-drive-4 network according to Embodiment 3 of this application.

FIG. 16 is a diagram of a beamforming network architecture of a 2-drive-4 network according to an embodiment of this application. As shown in FIG. 16, in the architecture, a first circuit 801 includes a bridge 1601, a connection circuit 802 includes a power splitter 1602 and a power splitter 1603, and a second circuit 803 includes a bridge 1607 and a bridge 1608.

An output end A and an output end B of a digital channel are separately coupled to the bridge 1601. The bridge 1601 performs digital weighting and analog on electrical signals of the output end A and the output end B, and then separately inputs the electrical signals to the power splitter 1602 and the power splitter 1603 separately. The power splitter 1602 divides an input electrical signal into two electrical signals with different powers based on a specific power division ratio. One electrical signal is input to an input end of the bridge 1607, and the other electrical signal is input to an input end of the bridge 1608. The power splitter 1603 divides an input electrical signal into two electrical signals with different powers based on a specific power division ratio. One electrical signal is input to another input end of the bridge 1607, and the other electrical signal is input to another input end of the bridge 1608. The bridge 1607 and the bridge 1608 receive two groups of electrical signals, perform digital weighting and analog on the two groups of electrical signals, and then separately output the two groups of different electrical signals to an antenna.

Optionally, the connection circuit 802 further includes a phase shifter 1604, a phase shifter 1605, and a phase shifter 1606. The phase shifter 1604 is disposed between an output end that is of the power splitter 1602 and that is coupled to the bridge 1608 and an input end that is of the bridge 1608 and that is coupled to the power splitter 1602. The phase shifter 1605 is disposed between an output end that is of the power splitter 1603 and that is coupled to the bridge 1607 and an input end that is of the bridge 1607 and that is coupled to the power splitter 1603. The phase shifter 1606 is disposed between an output end that is of the power splitter 1603 and that is directly coupled to the bridge 1608 and an input end that is of the bridge 1608 and that is directly coupled to the power splitter 1603. The phase shifter 1604 is configured to adjust an amplitude and a phase of an electrical signal output by the bridge 1607. The phase shifter 1605 and the phase shifter 1606 are configured to adjust an amplitude and a phase of an electrical signal output by the bridge 1608.

Certainly, in this application, two phase shifters may be coupled to two input ends of the bridge 1607, and one phase shifter may be coupled to one input end of the bridge 1608. This is not limited herein in this application.

Optionally, the second circuit 803 further includes a phase shifter 1609, a phase shifter 1610, and a phase shifter 1611. The phase shifter 1609 is disposed between an output end of the bridge 1607 and an antenna. The phase shifter 1610 and the phase shifter 1611 are separately disposed between two output ends of the bridge 1608 and antennas. The phase shifter 1609 is configured to adjust a phase of one of the electrical signals output by the bridge 1607. The phase shifter 1610 and the phase shifter 1611 are configured to adjust phases of two electrical signals output by the bridge 1608. In this application, the phase shifter 1609, the phase shifter 1610, and the phase shifter 1611 are further added herein, so that a phase of an output electrical signal is flexible and variable.

Certainly, in this application, two phase shifters may alternatively be coupled to the two output ends of the bridge 1607, and one phase shifter may be coupled to the one output end of the bridge 1608. This is not limited herein in this application.

In this application, a width of a beam and a height of a side lobe of a beam pair can be optimized by adjusting a power division ratio of the power splitter 1602 and the power splitter 1603, and a beam adjustment and optimization capability is improved. In addition, because a quantity of output ends of the digital channel is fixed, in other words, when a quantity of channels is fixed, an antenna installation platform is increased through a power splitter 902, and a system capacity and coverage effect are improved.

Figure 17:
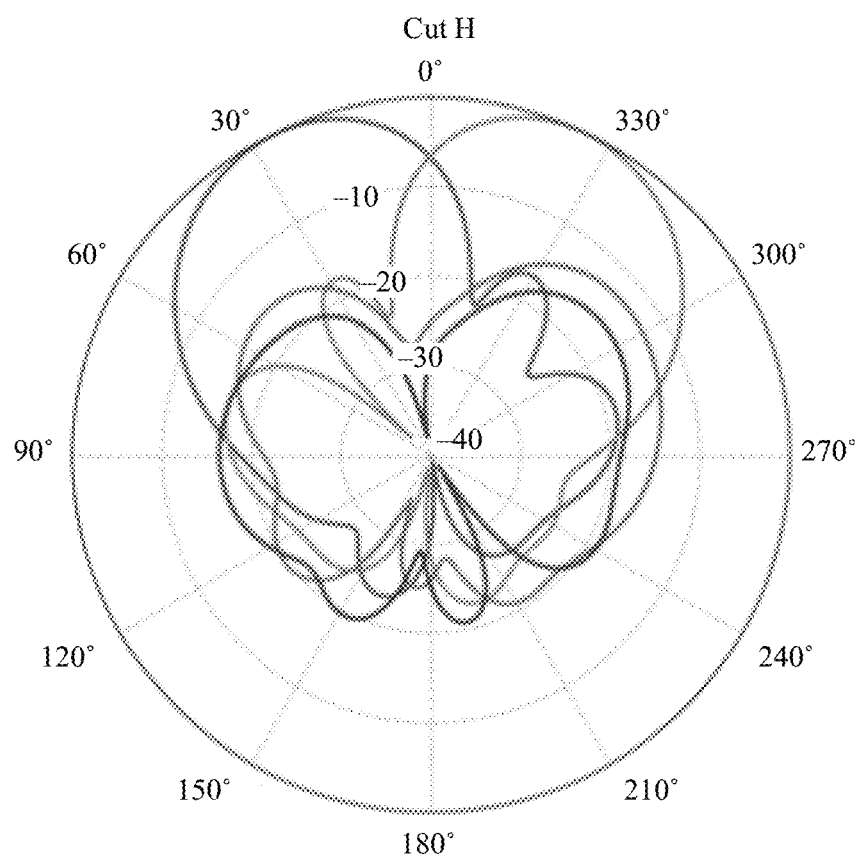
FIG. 17 is a beam coverage pattern according to Embodiment 3 of this application.

For example, a forming effect diagram of a pattern of a beam output by the beamforming network architecture of the 2-drive-4 network in this application is shown in FIG. 17. Compared with the conventional technology shown in FIG. 5 and FIG. 7, a pattern of a beamforming network in Embodiment 3 of this application ranges from −60° to 60°, and coverage effect is better. In addition, a beam electrical level at −60° and 60° decreases at a fast speed, rectangularity is good, and interference to a neighbor cell is weak.

Compared with a current butler matrix network, the beamforming network architecture provided in Embodiment 3 of this application has advantages of low complexity and easy engineering implementation. In addition, a beam output by an antenna is applicable to pattern forming capabilities in different scenarios. Antenna mapping of digital weighting and analog network forms beams with different directions and beam flexibility is increased.

The foregoing descriptions are merely specific implementations of this application, but are not intended to limit the protection scope of this application. Any equivalent modification or replacement figured out by a person skilled in the art within the technical scope disclosed in this application shall fall within the protection scope of this application. Therefore, the protection scope of this application shall be subject to the protection scope of the claims.

What is claimed is:

1. A beamforming network architecture of an N-drive-M network, comprising:
    a first circuit, comprising at least one first bridge, wherein input ends of each first bridge of the at least one first bridge are coupled to digital channels in N analog networks, and each first bridge of the at least one first bridge is configured to perform digital weighting and analog weighting on a received electrical signal, wherein N is a positive integer greater than 2;
    a second circuit comprising at least one second bridge, wherein output ends of each bridge of the at least one second bridge are coupled to M antennas, and each second bridge of the at least one second bridge is configured to perform digital weighting and analog weighting on a received electrical signal, wherein M is a positive integer greater than 2, and M is greater than or equal to N; and
    a connection circuit comprising at least one power splitter, wherein an input end of each power splitter of the at least one power splitter is coupled to an output end of the at least one first bridge in the first circuit, and an output end of the at least one power splitter is coupled to an input end of the at least one second bridge in the second circuit, and the connection circuit is configured to divide a quantity of electrical signals from N to M through power splitting.

2. The architecture according to claim 1, wherein the at least one first bridge of the first circuit comprises a first bridge, the at least one second bridge of the second circuit comprises a second bridge, and the at least one power splitter of the connection circuit comprises a first power splitter; and
    wherein input ends of the first bridge are coupled to the digital channels in the N analog networks, a first output end of the first bridge is coupled to an input end of the first power splitter, and a second output end of the first bridge is coupled to a first input end of the second bridge;
    a first output end of the first power splitter is coupled to an antenna, and a second output end of the first power splitter is coupled to a second input end of the second bridge; and output ends of the second bridge are separately coupled to the M antennas.

3. The architecture according to claim 1, wherein the at least one first bridge of the first circuit comprises a third bridge and a fourth bridge, the at least one second bridge of the second circuit comprises a fifth bridge, a sixth bridge, and a seventh bridge, and the at least one power splitter of the connection circuit comprises a second power splitter and a third power splitter, wherein:
    input ends of the third bridge and the fourth bridge are coupled to the digital channels in the N analog networks;
    a first output end of the third bridge is coupled to an input end of the second power splitter, and a second output end of the third bridge is coupled to one of a first input end of the fifth bridge and a first input end of the sixth bridge;

a first output end of the fourth bridge is coupled to an input end of the third power splitter, and a second output end of the fourth bridge is coupled to one end of a second input end of the sixth bridge and a first input end of the seventh bridge;

a first output end of the second power splitter is coupled to a second input end of the fifth bridge, and a second output end of the second power splitter is coupled to the other end of the second input end of the sixth bridge and the first input end of the seventh bridge;

a first output end of the third power splitter is coupled to a second input end of the seventh bridge, and a second output end of the third power splitter is coupled to the other end of the first input end of the fifth bridge and the first input end of the sixth bridge; and output ends of the fifth bridge, the sixth bridge, and the seventh bridge are separately coupled to the M antennas.

4. The architecture according to claim 3, wherein the connection circuit further comprises an eighth bridge and a ninth bridge, wherein:

an input end of the eighth bridge is coupled to the second output end of the second power splitter and the second output end of the fourth bridge, and an output end of the eighth bridge is coupled to the second input end of the sixth bridge and the first input end of the seventh bridge, and the eighth bridge is configured to perform digital weighting and analog weighting on a received electrical signal; and an input end of the ninth bridge is coupled to the second output end of the third power splitter and a second output end of the seventh bridge, and an output end of the ninth bridge is coupled to the first input end of the fifth bridge and the first input end of the sixth bridge, and the ninth bridge is configured to perform digital weighting and analog weighting on a received electrical signal.

5. The architecture according to claim 1, wherein each power splitter of the at least one power splitter divides an input electrical signal into two electrical signals with different powers based on a configured power division ratio.

6. A system, comprising:
N analog networks;
M antennas;
a first circuit, comprising at least one first bridge, wherein input ends of each first bridge of the at least one first bridge are coupled to digital channels in the N analog networks, and each first bridge of the at least one first bridge is configured to perform digital weighting and analog weighting on a received electrical signal, wherein N is a positive integer greater than 2;
a second circuit comprising at least one second bridge, wherein output ends of each bridge of the at least one second bridge are coupled to the M antennas, and each second bridge of the at least one second bridge is configured to perform digital weighting and analog weighting on a received electrical signal, wherein M is a positive integer greater than 2, and M is greater than or equal to N; and
a connection circuit comprising at least one power splitter, wherein an input end of each power splitter of the at least one power splitter is coupled to an output end of the at least one first bridge in the first circuit, and an output end of the at least one power splitter is coupled to an input end of the at least one second bridge in the second circuit, and the connection circuit is configured to divide a quantity of electrical signals from N to M through power splitting.

7. The system according to claim 6, wherein the at least one first bridge of the first circuit comprises a first bridge, the at least one second bridge of the second circuit comprises a second bridge, and the at least one power splitter of the connection circuit comprises a first power splitter; and wherein input ends of the first bridge are coupled to the digital channels in the N analog networks, a first output end of the first bridge is coupled to an input end of the first power splitter, and a second output end of the first bridge is coupled to a first input end of the second bridge; a first output end of the first power splitter is coupled to an antenna, and a second output end of the first power splitter is coupled to a second input end of the second bridge; and output ends of the second bridge are separately coupled to the M antennas.

8. The system according to claim 6, wherein the at least one first bridge of the first circuit comprises a third bridge and a fourth bridge, the at least one second bridge of the second circuit comprises a fifth bridge, a sixth bridge, and a seventh bridge, and the at least one power splitter of the connection circuit comprises a second power splitter and a third power splitter, wherein:

input ends of the third bridge and the fourth bridge are coupled to the digital channels in the N analog networks;

a first output end of the third bridge is coupled to an input end of the second power splitter, and a second output end of the third bridge is coupled to one of a first input end of the fifth bridge and a first input end of the sixth bridge;

a first output end of the fourth bridge is coupled to an input end of the third power splitter, and a second output end of the fourth bridge is coupled to one end of a second input end of the sixth bridge and a first input end of the seventh bridge;

a first output end of the second power splitter is coupled to a second input end of the fifth bridge, and a second output end of the second power splitter is coupled to the other end of the second input end of the sixth bridge and the first input end of the seventh bridge;

a first output end of the third power splitter is coupled to a second input end of the seventh bridge, and a second output end of the third power splitter is coupled to the other end of the first input end of the fifth bridge and the first input end of the sixth bridge; and output ends of the fifth bridge, the sixth bridge, and the seventh bridge are separately coupled to the M antennas.

9. The system according to claim 8, wherein the connection circuit further comprises an eighth bridge and a ninth bridge, wherein:

an input end of the eighth bridge is coupled to the second output end of the second power splitter and the second output end of the fourth bridge, and an output end of the eighth bridge is coupled to the second input end of the sixth bridge and the first input end of the seventh bridge, and the eighth bridge is configured to perform digital weighting and analog weighting on a received electrical signal; and an input end of the ninth bridge is coupled to the second output end of the third power splitter and a second output end of the seventh bridge, and an output end of the ninth bridge is coupled to the first input end of the fifth bridge and the first input end of the sixth bridge, and the ninth bridge is configured to perform digital weighting and analog weighting on a received electrical signal.

10. The system according to claim 6, wherein each power splitter of the at least one power splitter divides an input electrical signal into two electrical signals with different powers based on a configured power division ratio.

11. A system, comprising:
M antennas; and
a first circuit, comprising at least one first bridge, wherein input ends of each first bridge of the at least one first bridge are coupled to digital channels in N analog networks, and each first bridge of the at least one first bridge is configured to perform digital weighting and analog weighting on a received electrical signal, wherein N is a positive integer greater than 2;
a second circuit comprising at least one second bridge, wherein output ends of each bridge of the at least one second bridge are coupled to the M antennas, and each second bridge of the at least one second bridge is configured to perform digital weighting and analog weighting on a received electrical signal, wherein M is a positive integer greater than 2, and M is greater than or equal to N; and
a connection circuit comprising at least one power splitter, wherein an input end of each power splitter of the at least one power splitter is coupled to an output end of the at least one first bridge in the first circuit, and an output end of the at least one power splitter is coupled to an input end of the at least one second bridge in the second circuit, and the connection circuit is configured to divide a quantity of electrical signals from N to M through power splitting.

12. The system according to claim 11, wherein the at least one first bridge of the first circuit comprises a first bridge, the at least one second bridge of the second circuit comprises a second bridge, and the at least one power splitter of the connection circuit comprises a first power splitter; and
wherein input ends of the first bridge are coupled to the digital channels in the N analog networks, a first output end of the first bridge is coupled to an input end of the first power splitter, and a second output end of the first bridge is coupled to a first input end of the second bridge; a first output end of the first power splitter is coupled to an antenna, and a second output end of the first power splitter is coupled to a second input end of the second bridge; and
output ends of the second bridge are separately coupled to the M antennas.

13. The system according to claim 11, wherein the at least one first bridge of the first circuit comprises a third bridge and a fourth bridge, the at least one second bridge of the second circuit comprises a fifth bridge, a sixth bridge, and a seventh bridge, and the at least one power splitter of the connection circuit comprises a second power splitter and a third power splitter, wherein:
input ends of the third bridge and the fourth bridge are coupled to the digital channels in the N analog networks;
a first output end of the third bridge is coupled to an input end of the second power splitter, and a second output end of the third bridge is coupled to one of a first input end of the fifth bridge and a first input end of the sixth bridge;
a first output end of the fourth bridge is coupled to an input end of the third power splitter, and a second output end of the fourth bridge is coupled to one end of a second input end of the sixth bridge and a first input end of the seventh bridge;
a first output end of the second power splitter is coupled to a second input end of the fifth bridge, and a second output end of the second power splitter is coupled to the other end of the second input end of the sixth bridge and the first input end of the seventh bridge;
a first output end of the third power splitter is coupled to a second input end of the seventh bridge, and a second output end of the third power splitter is coupled to the other end of the first input end of the fifth bridge and the first input end of the sixth bridge; and
output ends of the fifth bridge, the sixth bridge, and the seventh bridge are separately coupled to the M antennas.

14. The system according to claim 13, wherein the connection circuit further comprises an eighth bridge and a ninth bridge, wherein:
an input end of the eighth bridge is coupled to the second output end of the second power splitter and the second output end of the fourth bridge, and an output end of the eighth bridge is coupled to the second input end of the sixth bridge and the first input end of the seventh bridge, and the eighth bridge is configured to perform digital weighting and analog weighting on a received electrical signal; and
an input end of the ninth bridge is coupled to the second output end of the third power splitter and a second output end of the seventh bridge, and an output end of the ninth bridge is coupled to the first input end of the fifth bridge and the first input end of the sixth bridge, and the ninth bridge is configured to perform digital weighting and analog weighting on a received electrical signal.

15. The system according to claim 11, wherein each power splitter of the at least one power splitter divides an input electrical signal into two electrical signals with different powers based on a configured power division ratio.

16. The system according to claim 11, wherein a quantity of bridges of the at least one first bridge is less than a quantity of bridges of the at least one second bridge.

17. The system according to claim 11, wherein the first circuit has two bridges.

18. The system according to claim 17, wherein the second circuit has 3 bridges.

19. The system according to claim 11, wherein a quantity of the at least one first bridge is the same as a quantity of bridges in the connection circuit.

20. The system according to claim 11, wherein the connection circuit has a same quantity of bridges and power splitters.

* * * * *